(12) United States Patent
Bell et al.

(10) Patent No.: US 8,528,134 B2
(45) Date of Patent: Sep. 10, 2013

(54) METHOD OF PREVENTING BED BUGS FROM ESCAPING A MATTRESS ENCASEMENT VIA A ZIPPER OPENING

(75) Inventors: James A. Bell, Glencoe, IL (US); Yueh-Jyh Chen, Shanghai (CN); Ching-Yao Yeh, Shanghai (CN)

(73) Assignee: JAB Distributors, LLC, Wheeling, IL (US)

( * ) Notice: Subject to any disclaimer, the term of this patent is extended or adjusted under 35 U.S.C. 154(b) by 0 days.

(21) Appl. No.: 13/252,337

(22) Filed: Oct. 4, 2011

(65) Prior Publication Data

US 2012/0023712 A1 Feb. 2, 2012

Related U.S. Application Data

(63) Continuation of application No. 12/703,900, filed on Feb. 11, 2010, now abandoned, which is a continuation of application No. 12/498,863, filed on Jul. 7, 2009, now abandoned, which is a continuation of application No. 12/255,913, filed on Oct. 22, 2008, now abandoned, which is a continuation of application No. 11/756,249, filed on May 31, 2007, now Pat. No. 7,552,489.

(60) Provisional application No. 60/895,011, filed on Mar. 15, 2007.

(51) Int. Cl.
*A47G 9/00* (2006.01)
*A47C 31/00* (2006.01)
*A44B 19/26* (2006.01)

(52) U.S. Cl.
USPC .............. 5/499; 5/738; 5/699; 5/939; 24/389

(58) Field of Classification Search
USPC ............ 5/699, 738, 939, 496, 737, 490, 482, 5/484, 501, 499; 24/389
See application file for complete search history.

(56) References Cited

U.S. PATENT DOCUMENTS 1,991,943 A 2/1935 Keviczky
2,400,731 A 5/1946 Armstrong
(Continued)

FOREIGN PATENT DOCUMENTS

DE 9318318 U1 2/1994
DE 19755498 A1 6/1999
(Continued)

OTHER PUBLICATIONS

Doggett, Stephen; Geary, Merilyn; Russell, Richard, "Encasing Mattresses in Black Plastic Will Not Provide Thermal Control of Bed Bugs," Cimex spp. (Hemiptera: Cimicidae), Department of Medical Entomology, Institute for Clinical Pathology and Medical Research, University of Sydney, Westmead Hospital, Westmead, NSW 2145, Australia, 2006.

(Continued)

*Primary Examiner* — Robert G Santos
(74) *Attorney, Agent, or Firm* — McAndrews, Held & Malloy, Ltd.

(57) ABSTRACT

A mattress encasement made of bug impervious fabric provides a zipper opening for removal of the mattress. A foam pad is stitched at an end of the zipper closure such that when the zipper is located at or near the end, a channel is provided to prevent or obstruct the escapement of bed bugs via the channel and out from a mattress encased by the mattress encasement.

8 Claims, 3 Drawing Sheets

(56) References Cited

U.S. PATENT DOCUMENTS

| | | | |
|---|---|---|---|
| 2,496,878 A | 2/1950 | Krupp | |
| 2,689,961 A | 9/1954 | Lieberthal | |
| 2,907,055 A | 10/1959 | Berman | |
| 3,389,441 A | 6/1968 | Heimberger | |
| 3,538,914 A | 11/1970 | Myers | |
| 4,164,797 A | 8/1979 | Golembeck | |
| 5,050,256 A | 9/1991 | Woodstock | |
| 5,253,395 A | 10/1993 | Yano | |
| 5,321,861 A | 6/1994 | Dancey et al. | |
| 5,444,898 A | 8/1995 | Norvell | |
| 5,513,403 A | 5/1996 | Wooten, Jr. | |
| 5,966,759 A | 10/1999 | Sanders et al. | |
| 6,017,601 A | 1/2000 | Amsel | |
| 6,092,543 A | 7/2000 | Roh | |
| 6,277,770 B1 | 8/2001 | Smith, III et al. | |
| 6,351,864 B1 | 3/2002 | Karafa et al. | |
| 6,363,553 B1 | 4/2002 | Baumgartel et al. | |
| 6,571,432 B1 | 6/2003 | Rindle | |
| 6,859,958 B2 | 3/2005 | LaMantia | |
| 6,948,207 B2 | 9/2005 | Daly | |
| 6,964,074 B2 | 11/2005 | Carlitz | |
| 7,062,808 B1 | 6/2006 | Brogden | |
| 7,181,797 B2 | 2/2007 | Chase | |
| 7,552,489 B2 * | 6/2009 | Bell et al. | 5/499 |
| 8,087,111 B2 * | 1/2012 | Paris | 5/499 |
| 8,156,588 B2 * | 4/2012 | Svoboda | 5/699 |
| 8,307,480 B2 * | 11/2012 | Tirpan | 5/699 |
| 8,347,430 B2 * | 1/2013 | Malouf et al. | 5/484 |
| 8,413,276 B2 * | 4/2013 | Rattner et al. | 5/699 |
| 2005/0032446 A1 | 2/2005 | Smith, III et al. | |
| 2008/0222808 A1 * | 9/2008 | Bell et al. | 5/500 |
| 2008/0250561 A1 | 10/2008 | Poston | |
| 2009/0049608 A1 * | 2/2009 | Bell et al. | 5/499 |
| 2009/0271926 A1 * | 11/2009 | Bell et al. | 5/499 |
| 2010/0054637 A1 * | 3/2010 | Tirpan | 383/64 |
| 2010/0281614 A1 * | 11/2010 | Park | 5/484 |
| 2011/0010856 A1 * | 1/2011 | Bell et al. | 5/499 |
| 2011/0041247 A1 * | 2/2011 | Moon | 5/499 |
| 2011/0099714 A1 * | 5/2011 | Svoboda | 5/499 |
| 2011/0162140 A1 * | 7/2011 | Paris | 5/499 |
| 2012/0023712 A1 * | 2/2012 | Bell et al. | 24/389 |
| 2012/0084918 A1 * | 4/2012 | Rattner et al. | 5/500 |
| 2012/0102646 A1 * | 5/2012 | Chen et al. | 5/499 |
| 2012/0167301 A1 * | 7/2012 | Michael | 5/482 |
| 2012/0167302 A1 * | 7/2012 | Malouf et al. | 5/484 |
| 2012/0167307 A1 * | 7/2012 | Michael | 5/501 |
| 2012/0192356 A1 * | 8/2012 | Svoboda | 5/699 |
| 2012/0260426 A1 * | 10/2012 | Dobin | 5/499 |
| 2012/0311785 A1 * | 12/2012 | Goldberg | 5/498 |

FOREIGN PATENT DOCUMENTS

| | | |
|---|---|---|
| JP | 09117392 | 5/1997 |
| JP | 2004267712 | 9/2004 |
| JP | 2007112507 | 5/2007 |
| WO | 02080736 | 10/2002 |

OTHER PUBLICATIONS

European Search Report corresponding to European Application No. 08003688.2-2313, mailed Aug. 18, 2008, 7 pages.

Request for Reexamination of U.S. Patent No. 7,552,489, filed Jan. 13, 2010.

Defendants American Textile Company Inc.'s and Target Corporation's intiital Non-Infringement, Unenforceability and Invalidity Contentions Pursuant to LPR 2.3, served Feb. 19, 2010, including 3 Exhibits 1-3.

Bedbug.com's Initial non-Infringement, Invalidity and Unenforceability Contentions, Served Feb. 19, 2010, including Exhibits A-D.

London Luxury, LLC's and Bed Bath & Beyond, Inc.'s Initial Non-Infringement, Invalidity and Unenforceability Contentions, Served Feb. 19, 2010, including Exhibits A-D.

EPO Communication dated May 6, 2010 with European Search Report in Application 10002648.3-2313.

European Patent Office, Communication dated Jun. 21, 2011, with extended European search report in Application No. 11002599.6-2313.

US District Court for the Northern District of Illinois, Eastern Division, *Petra Michael v. James A. Bell* and *JAB Distributors LLC*, Case No. 11 CV 04484, Plaintiff's Motion for Leave to File Supplemental Consolidated Response in Opposition to Defendants' Motions to Dismiss Amended Complaint, dated Nov. 27, 2012. (5 pages).

Canadian Intellectual Property Office, Office action in Application No. 2,624,540, dated Aug. 31, 2012.

US District Court for the Northern District of Illinois, Eastern Division, *Petra Michael v. James A. Bell* and *JAB Distributors LLC*, Case No. 11 CV 04484, Plaintiff's Consolidated Response in Opposition to Both Defendants' Motions to Dismiss Amended Complaint, dated Nov. 13, 2012.

Plaintiff Petra Michael's Jul. 1, 2011 Complaint for Civil Action No. 1:11-cv-04484, and the associated exhibits. (Doc. No. 1).

Defendant's Memorandum in Support of Its Motion to Dismiss, filed Sep. 16, 2011 Doc. No. 15).

Defendant's Memorandum in Support of His Motion to Dismiss, filed Sep. 16, 2011 Doc. No. 17).

Defendant's Motion to Dismiss, filed Sep. 16, 2011 (Doc. No. 13).

Defendant's Motion to Dismiss, filed Sep. 16, 2011 (Doc. No. 16).

Plaintiff's Brief in Opposition to Motion to Dismiss, filed Oct. 18, 2011 (Doc. No. 21).

Defendants' Joint Reply in Support of Their Motions to Dismiss, filed Nov. 1, 2011 (Doc. No. 23).

Memorandum Opinion and Order, Issued Aug. 13, 2012 (Doc. No. 29).

Plaintiff's Amended Complaint, filed Sep. 4, 2012 (Doc. No. 30).

Notice of Filing of Amended Complaint, filed Sep. 4, 2012 (Doc. No. 31).

\* cited by examiner

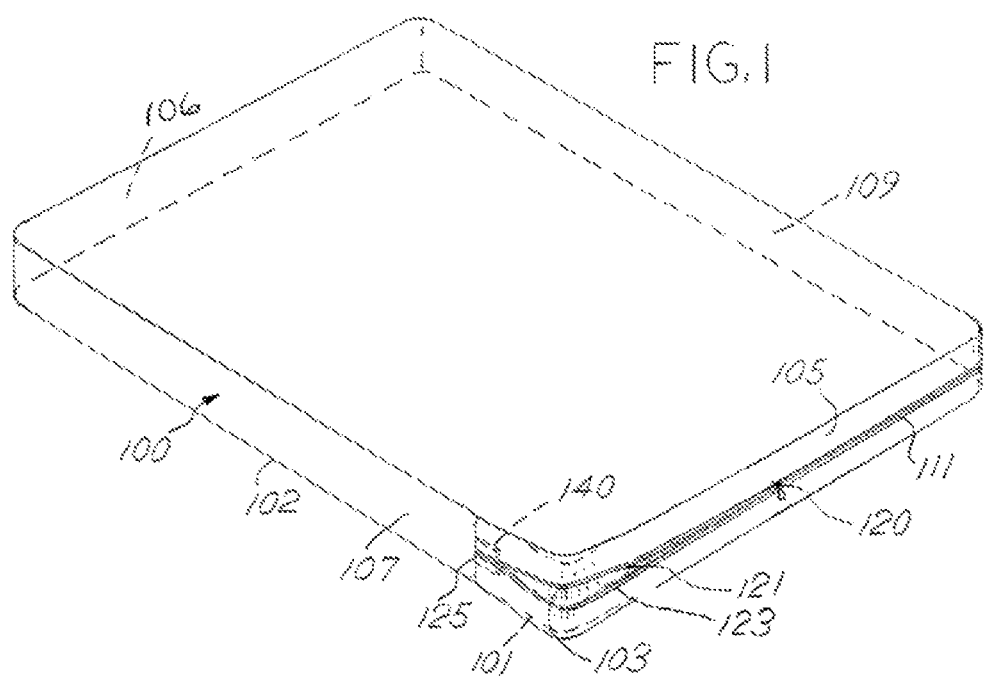
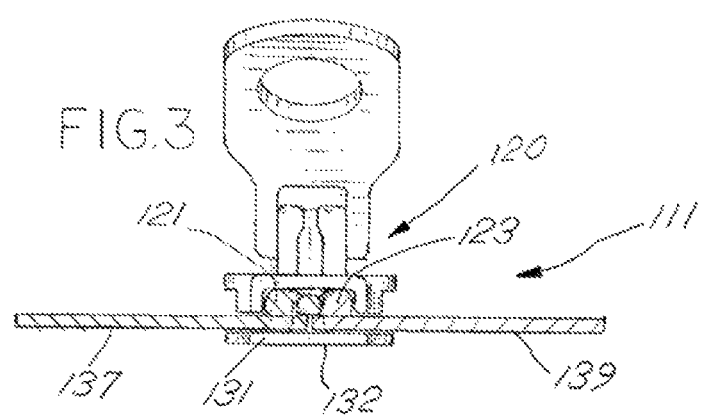

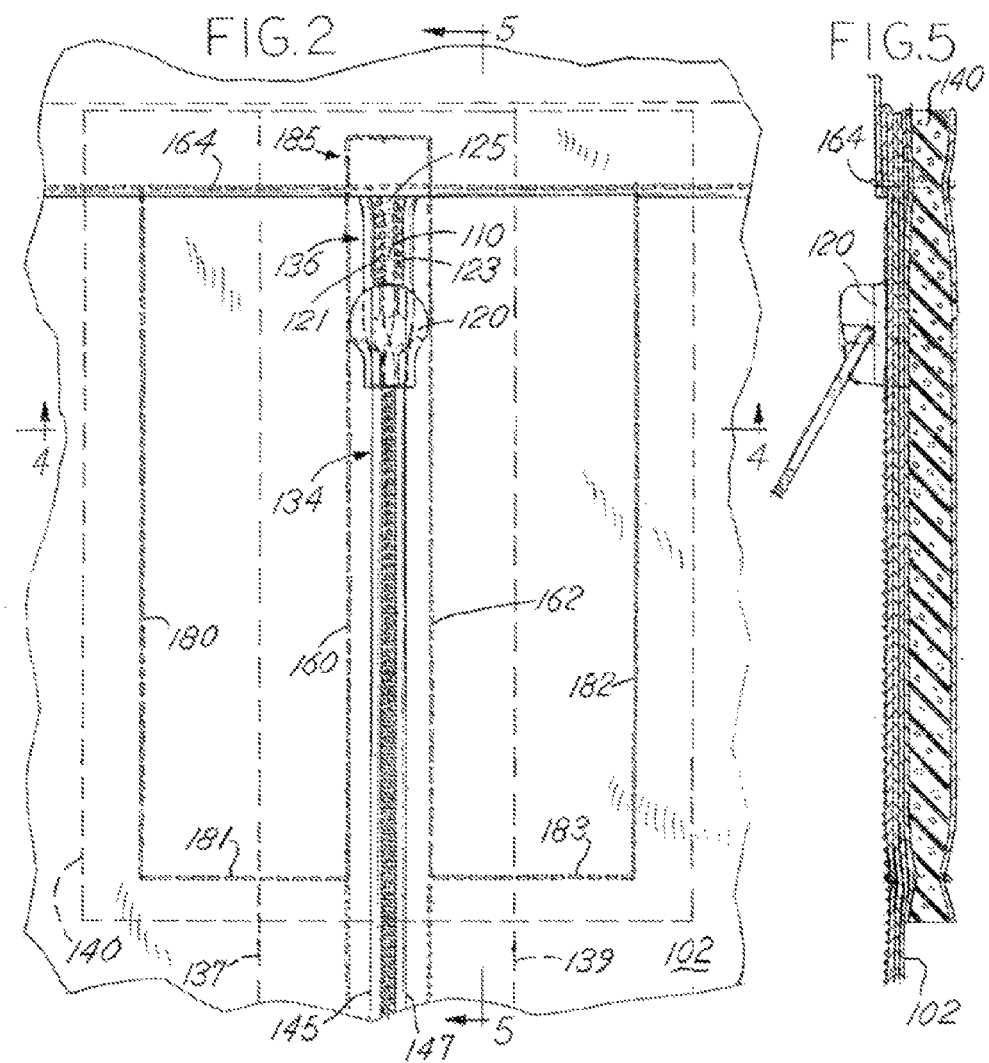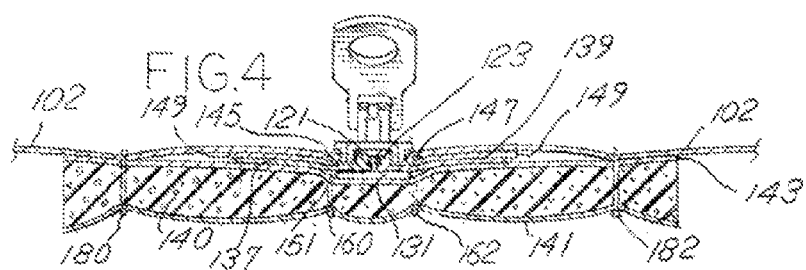

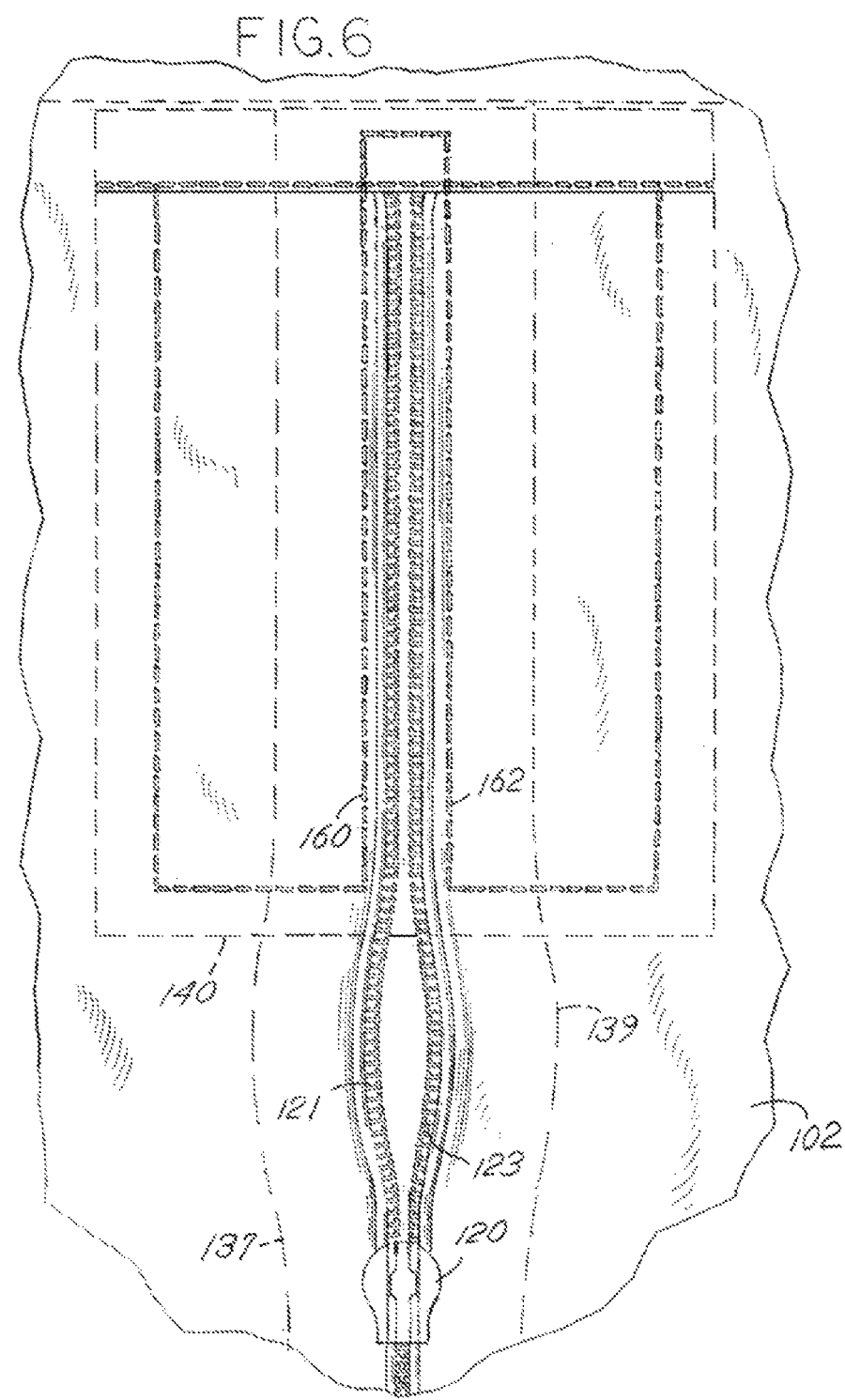

METHOD OF PREVENTING BED BUGS FROM ESCAPING A MATTRESS ENCASEMENT VIA A ZIPPER OPENING

CROSS-REFERENCE TO RELATED APPLICATIONS

This application makes reference to, and claims priority to, U.S. non-provisional application Ser. No. 12/703,900 "Mattress Encasement For Preventing Bed Bug Escapement Via A Zipper Opening," filed Feb. 11, 2010, which, in turn, claims priority to U.S. patent application Ser. No. 12/498,863 filed Jul. 7, 2009 titled "Mattress Encasement For Preventing Bed Bug Escapement Via A Zipper Opening," which, in turn, claims priority to U.S. patent application Ser. No. 12/255,913 filed Oct. 22, 2008 titled "Mattress Encasement For Preventing Bed Bug Escapement Via A Zipper Opening," which, in turn, claims priority to U.S. patent application Ser. No. 11/756,249 filed May 31, 2007 titled "Mattress Encasement For Preventing Bed Bug Escapement Via A Zipper Opening," which issued on Jun. 30, 2009 as U.S. Pat. No. 7,552,489. U.S. application Ser. No. 11/756,249, in turn, claims priority to U.S. Provisional Application No. 60/895,011, filed Mar. 15, 2007 and titled "Mattress Encasement For Preventing Bed Bug Escapement Via A Zipper Opening". Each of U.S. application Ser. Nos. 12/703,900, 12/498,863, 12/255,913, 11/756,249 and 60/895,011 are hereby incorporated by reference in their entireties.

FIELD OF THE INVENTION

The invention relates to an apparatus and method for preventing bed bugs from escaping out of a bed mattress. More particularly, the invention relates to a zipper closure structure on a mattress encasement which, while allowing removal of the mattress from the encasement, prevents the escapement of bed bugs out of the mattress and past the encasement.

BACKGROUND OF THE INVENTION

Bed bugs are a type of insect that commonly hides within bed mattresses. Such bed bugs are found in motels, hostels or boarding houses where itinerant travelers find overnight lodging. Bed bugs will feed off of the blood of humans sleeping on the mattresses that harbor these insects. Typically, a bed bug will crawl out of the mattress during the night, bite the sleeping victim, and then return to the safe confines of the mattress.

To prevent the escapement of bed bugs from the mattress, and thus contain and starve the bugs, a technique has been devised in which the mattress is surrounded with a fabric cover or encasement to seal the exit of the bugs. The encasement is slipped onto the mattress and closed via a slide fastening mechanism such as a zipper. Bugs escaping from the mattress will encounter the barrier of the fabric cover, and thus will be prevented from reaching a human sleeping on the mattress.

Problems exist, however, with the use of such protective mattress covers or encasements. For example, a user may fail to completely close the zipper on the encasement, or the zipper may become partially unzipped through movement or rustling of the mattress, as for example, when the bed is made and remade. This results in an opening at the zipper end through which bed bugs may escape. Indeed, even zippers that have been carefully and completely closed may still leave a narrow opening at the end of the zipper that is a large enough opening for a small bed bug to crawl through and escape.

Accordingly, there exists a need to prevent the escapement of bed bugs from a zipper opening in a mattress protective encasement.

SUMMARY OF THE INVENTION

It is therefore an object of the present invention to provide a mattress encasement structure which prevents bed bug escapement from the zipper opening of the encasement.

It is yet another object of the present invention to provide a method of preventing bed bugs from exiting a mattress encasement at the zipper end of the encasement.

These and other objects of the invention are achieved in a mattress encasement having a zipper opening for receiving a mattress. A barrier structure is disposed at the zipper end of the encasement in order to thwart bed bug travel to any small opening which may faun at the zipper end.

In addition, objects of the invention are achieved in a method for guiding bed bugs housed within a mattress relative to a zipper portion of a mattress encasement. The bugs are channeled away from the zipper end of the encasement using a barrier structure.

BRIEF DESCRIPTION OF THE DRAWINGS

FIG. 1 is a perspective view of an embodiment of a mattress encasement covering a mattress.

FIG. 2 is an enlarged top view of a zipper end location of the mattress encasement of FIG. 1.

FIG. 3 is an enlarged end view of a zipper of the encasement of FIG. 1.

FIG. 4 is an enlarged cross sectional end view of the zipper end location of FIG. 2, taken along line 4/4 in FIG. 2.

FIG. 5 is a cross sectional side view of the zipper end location of FIG. 2, taken along line 5/5 in FIG. 2.

FIG. 6 is a n enlarged top view of the zipper end location of the mattress encasement of FIG. 1 in which the zipper is opened providing an opening to the mattress.

DETAILED DESCRIPTION OF THE PREFERRED EMBODIMENTS

Referring to FIG. 1, a mattress encasement 100 surrounds a conventional mattress 101. Mattress encasement 100 may be constructed from a fabric 102 of a size and shape so as to surround and engulf the entirety of mattress 101. Fabric 102 of the encasement is woven so as to be impervious to bed bugs.

An opening 103 is formed at one end 105 of the encasement. Opening 103 extends along the entire width of end 105, and extends a short distance along each of sides 107, 109 of the encasement. Opening 103 allows mattress 101 to slide into and out of encasement 100 so that the encasement may be laundered from time to time.

Opening 103 may be closed by a zipper closure 111 to seal the entire encasement opening 103. Zipper closure 111 includes a zipper head 120 and a pair of zipper tracks 121, 123. Tracks 121, 123 are disposed around opening 103 in a confronting relationship and are zipped together in a conventional fashion. Tracks 121, 123 have meshable teeth which interleave together as caused by zipper head 120 guiding the two tracks 121, 123 together.

Referring to FIG. 2, zipper head 120 is shown connected to zipper tracks 121, 123 and disposed in a position near an end location 125. End location 125 is where zipper head 120 is stopped from further movement along tracks 121, 123. The tracks are shown intermeshed behind zipper head 120, as indicated at 134, to close opening 103 (FIG. 1), and form a seal by the closed tracks that is impervious to bed bugs. Also as indicated at 136, zipper tracks 121, 123 located in front of zipper head 120 are not intermeshed, and define an unzipped portion of the mattress encasement. A small zipper opening 110 is thus formed in front of zipper head 120 in the proximity of end location 125. Opening 110 extends between end location 125 and zipper head 120.

As shown in FIG. 2, a rectangular shaped foam pad 140 is disposed beneath fabric 102, and thus, beneath the zipper closure at the proximity of end location 125. As shown in FIGS. 4 and 5, foam pad 140 is of a much greater thickness than fabric 102.

Foam pad 140 may be made from a flexible resilient foam material, but other materials may be used as well. For example, foam pad 140 may be a fabric material, a rubber material, or any other material which may be stitched to fabric 102. In addition, foam pad 140 may be compressible such that contact made by mattress 101 against the lower surface 141 of pad 140 causes the pad to compress between the mattress and the encasement fabric 102, forcing the top surface 143 of pad 140 into contact with fabric 102 as well as into contact with portions of the zipper structure disposed above pad 140.

As shown in FIG. 2, foam pad 140 is stitched to fabric 102 in order to secure the foam pad in place. It is readily apparent from FIGS. 2 and 4-6, that the foam pad 140 is a unitary and continuous barrier. A pair of outer rows of stitches 180, 182 are formed parallel to and along each side of the zipper tracks 121, 123. Additionally, a pair of inner rows of stitches 160, 162 may be formed parallel to and along each side of zipper tracks 121, 123. A fifth row of stitches 164 runs perpendicular to zipper tracks 121, 123 and connects all four stitch rows 160, 162, 180, 182. Row 164 traverses end location 125 of zipper tracks 121, 123. Also, two rows of stitches 181, 183 run perpendicular to zipper tracks 121, 123 and connect stitch rows 160, 180, and connect rows 162, 182, respectively. Stitch rows 181, 183 are co-linear and stop short of the zipper tracks, as shown.

Stitching is applied so as to securely attach foam pad 140 to encasement fabric 102. The stitches are sufficiently close together so as to prevent a bed bug from passing through any of the stitched rows. For example, referring to FIG. 2, a bed bug may not pass through stitched row 164, between pad 140 and fabric 102 to get to opening 110.

Stitching patterns of a rectangular shape are thus formed on each side of the zipper track, attaching foam pad 140 to encasement fabric 102. As will suggest itself, other stitching patterns may be used. For example a stitching pattern of an "X" shape, or diagonal lines may also be employed. In addition, stitching may encompass end location 125, as shown at 185. As shown in FIGS. 4 and 5, the fabric 102 may be folded at end location 125 to provide further support, or the like.

Referring to FIG. 3, zipper closure 111 is shown separate from encasement 100. Zipper head 120 includes a lower flat planar member 131 which lies below zipper tracks 121, 123. Member 131 serves as one guiding surface to guide the tracks together. The tracks are secured to respective pieces of fabric or extensions 137, 139 which provide a means for securing the tracks to the fabric 102. Fabric extensions 137, 139 are shown in FIG. 2.

Referring now to FIG. 4, flat planar member 131 of the zipper head is shown below the two zipper tracks 121, 123. The fabric extensions 137, 139 of the tracks are sewn to the casement fabric 102 at respective locations 145, 147, and then fabric 102 is folded back over itself leaving two end portions 149 of fabric 102.

As seen in FIG. 4, a space 151 is formed below the zipper tracks 121, 123, and above foam pad 140. This space 151 provides a channel along which the bottom portion 131 of zipper head 120 moves. As seen in FIG. 2, the stitching segments 160, 162 form the outer extent of the sides of channel 151. The top of channel 151 is bound by zipper tracks 121, 123 and the bottom of channel 151 is bound by foam pad 140. Even if a bed bug were to crawl along the entire length of channel 151 toward opening 110, the bug will be confronted with a barrier posed by lower portion 131 of the zipper head. To thwart the bug from crawling beneath portion 131 of the zipper head, the top surface 143 of the foam pad is forced upwardly into contact with the bottom surface 132 (FIG. 3) of portion 131 by the compression of foam pad 140 caused by the mattress snugly fitting within the encasement fabric 102.

Foam pad 140 is of a length such that when zipper 120 is at a location at or near end point 125, channel 151 is relatively long making it difficult for a bed bug to crawl through channel 151 to reach the zipper end 125.

In order to prevent bed bugs from escaping through the channel 151, it is preferred that the maximum height of the channel be small relative to the height of a crawling bed bug and yet provide a sufficient space to receive the lower portion 131 of zipper head 120. Accordingly, depending on the material of the foam pad 140 and the fabric cover 102, and the size of the zipper head 120 and zipper tracks 121, 123, the preferred distance between stitching segments 160 and 162, and the zipper tracks will vary. The size of the channel 151 may also vary depending on the size of the bed bugs intended to be prevented from escaping the mattress.

For example, the distance between stitching rows 160, 162, and respective tracks 121, 123 may be 1/16 of an inch. The distance between stitching rows 160, 162 may be 5/16 of an inch. The distance between stitching rows 164, 181 may be 2½ inches. The height of lower portion 131 of the zipper may be 1/32 of an inch.

Referring to FIG. 6, as zipper head 120 moves along zipper tracks 121, 123 and away from foam pad 140, opening 110 enlarges. As shown in FIG. 1, foam pad 140 is located a distance away from end 105 so as to allow opening 110 to enlarge sufficiently to insert and/or remove mattress 101. As will suggest itself, encasement 100 may be constructed in pieces and sewn together.

Accordingly, bed bugs attempting to escape the mattress encasement are impeded from crawling through zipper opening 110 (FIG. 2) without first crawling through channel 151. When the mattress encasement 100 is properly closed around a mattress, the size of the encasement is such as to fit snugly around the mattress allowing the mattress to abut against foam pad 140. Foam pad 140 will thus be forced against the tracks 121, 123, and lower portion 131 of the zipper head. The zipper head may be pulled along the tracks and against this bias to open the encasement.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of preventing bed bugs from escaping a zipper opening formed at the terminal end of a zipper closure disposed in a closeable apparatus, said closeable apparatus comprising (1) an encasement material formed of a bed bug impervious material, (2) an opening from which bed bugs may escape, and (3) a zipper closure, said zipper closure located in said opening and having a zipper head and a pair of zipper tracks mateable together to provide closure to the zipper opening, said zipper opening formed at the terminal end of the zipper closure by an unzipped portion of said zipper tracks, said zipper head having a lower portion disposed beneath said zipper tracks, said method comprising the steps:

a) attaching a barrier beneath the zipper tracks to block bed bugs from approaching said zipper opening at the terminal end of said zipper closure, said attaching including securing a first portion of the barrier at the terminal end of the zipper closure to block bed bug movement along the longitudinal axis of said zipper tracks, securing a second portion of the barrier along one side of said zipper tracks to block bed bug movement orthogonal to the longitudinal axis of said zipper tracks, and securing a third portion of the barrier along the other side of said zipper tracks to block bed bug movement orthogonal to the longitudinal axis of said zipper tracks;

b) creating a channel beneath said zipper tracks adjacent the terminal end of the zipper closure, including forming said channel from said barrier to have an entrance (1) spaced a first distance from the terminal end of the zipper closure and (2) disposed beneath the said zipper tracks and of a size for receiving the lower portion of said zipper head, and forming said channel to have a confined space sufficient to permit movement of the lower portion of the zipper head along said channel; and c) forming said channel to block movement of bed bugs along said channel and around said lower portion of said zipper head in order to prevent bed bugs escaping through said zipper opening when said lower portion of said zipper head is disposed in said channel a second distance less than said first distance, from the terminal end of the zipper closure.

2. A method according to claim 1 wherein said step of securing the barrier at the terminal end of said tracks includes stitching the barrier to the encasement.

3. A method according to claim 2 wherein said step of stitching includes using thread.

4. A method according to claim 2 wherein said stitching step includes providing two rows of stitching, and wherein the distance between said two rows of stitching is about $5/160$ of an inch.

5. A method according to claim 1 wherein said step of creating a channel includes sizing said channel depending on the size of said lower portion of said zipper head.

6. A method according to claim 1 wherein said step of creating a channel includes determining a dimension of said lower portion of said zipper head.

7. A method according to claim 6 wherein said step of creating a channel includes sizing said channel in response to said step of determining a dimension of said lower portion of said zipper head.

8. A method according to claim 7 wherein said dimension of said lower portion of said zipper head is around $1/32$ of an inch.

* * * * *